Patented July 24, 1928.

1,678,345

UNITED STATES PATENT OFFICE.

RICHARD V. MATTISON, OF AMBLER, PENNSYLVANIA, ASSIGNOR TO KEASBEY & MATTISON COMPANY, A CORPORATION OF PENNSYLVANIA.

MILLBOARD PRODUCT AND PROCESS.

No Drawing.    Application filed June 25, 1921.    Serial No. 480,356.

This invention relates to artificial products of the general character of millboard, wall board, roofings, and the like, and its object is to produce a composition, and process of making the same, which shall be durable, fireproof, water and weather resisting, easily handled and worked, and generally adapted to meet the requirements of such material.

In carrying out my invention I mix hydraulic cement, fibrous material and one or more alkaline earth carbonates or hydrates or a mixture of the two, and in the presence of water, work this mixture upon a millboard machine to form sheets or plates, and then before the cement sets subject the sheets or plates to high pressure. The fibrous material is preferably cellulose or asbestos, and the alkaline earth carbonate is preferably calcium carbonate, magnesium carbonate, or a mixture of approximately 80% to 90% calcium carbonate and 20% to 10% magnesium carbonate, specially prepared by being made into a finely divided, light bulky mixture. An excellent example of the condition in which the carbonates should be is the residue of mixed calcium carbonate and magnesium carbonate resulting from the commercial manufacture of magnesium carbonate from dolomite in which calcium carbonate mixed with a small proportion of magnesium carbonate is precipitated from a solution of calcium and magnesium hydrates by pumping carbon dioxide therethrough. The precipitate is light, bulky, smooth, finely divided, and mixes intimately with the cement and fibrous material. A good example of proportions to be used is about 50%, by weight, of hydraulic cement, about 16⅔% of asbestos fibre, and about 33⅓% of calcium carbonate and magnesium carbonate, the latter being from about one-tenth to one-fifth in proportion to the calcium carbonate, though for the manufacture of a product of lighter weight a greater proportion of magnesium carbonate may be employed. These materials should be intimately mixed in a beating engine with a relatively large quantity of water, or at least sufficient whereby the cement will assume a sticky, gelatinous, or colloidal condition. The mixture is flowed upon the moving band of a millboard machine, or transferred thereto from the gauze cylinder of a cylinder machine, and from the moving band is preferably wound up in layers on a cylinder to form a sheet or plate of the desired thickness. The plates, sheets or slabs may, however, be formed in any convenient manner. The degree to which the cement is colloided will depend upon the amount of water used, its distribution and temperature and the extent to which it is allowed to gelatinize or colloid the cement. The more the cement is colloided the more homogeneous will be the resultant product.

After the sheets, plates or slabs are formed, and before the cement sets, they should be subjected to high pressure, preferably several tons per square inch in a hydraulic press.

The proportions above given will of course be modified according to conditions, and, if desired other substances may be added. For example finely divided silica sand may be added, and under such circumstances a good mixture would be about 10% by weight of silica sand, 40% of hydraulic cement, 16⅔% of asbestos fibre and 33⅓% of precipitated calcium and magnesium carbonates.

Also in some cases instead of using carbonates, I may use hydrates, or mixtures of carbonates and hydrates, although I prefer the carbonates because they tend less to interfere with or impair coloring matter, and the hydrates tend to clog the belts and thus lessen the amount of production.

The composition prepared as above described is suitable for a variety of uses. It is particularly adapted for use as millboard or wall-board on account of being non-heat and non-sound conducting and also fireproof. The porous condition of the earthy carbonates, containing many occluded air spaces or cells aids materially in attaining these characteristics. Another important characteristic of the composition is that it will readily receive and hold coloring matter without deteriorating the same or impairing its permanency. The product furthermore is self-containing, strong and durable.

I claim:—

1. A composition comprising hydraulic cement, asbestos fibre and a finely divided precipitated calcium carbonate.

2. A composition comprising hydraulic cement, asbestos fibre and a finely divided precipitated magnesium carbonate.

3. A composition comprising hydraulic cement, asbestos fibre and a mixture of finely divided precipitated calcium and magnesium carbonates.

4. A composition comprising hydraulic cement, asbestos fibre and a mixture of finely divided precipitated calcium and magnesium carbonates, said composition having been intimately mixed with a large quantity of water and subjected to pressure to remove the water therefrom before the cement is set.

5. A composition comprising colloided hydraulic cement, asbestos fibre, and a precipitated mixture of calcium and magnesium carbonates in which the calcium carbonate predominates, the mixture being subjected to pressure before the cement sets.

6. A composition comprising colloided hydraulic cement, finely divided silica, asbestos fibre, and a precipitated mixture of calcium and magnesium carbonates in which the calcium carbonate predominates, the mixture being subjected to pressure before the cement sets.

7. The process of making sheet or plate material which consists of first intimately mixing hydraulic cement, fibrous material and a finely divided mixture of finely divided precipitated calcium carbonate and magnesium carbonate in which the calcium carbonate predominates, in the presence of water, then working the mixture into sheet form on a mill-board machine before the cement sets, and then subjecting the sheets to pressure and allowing the cement to set.

8. The process of making sheet or plate material which consists of first intimately mixing hydraulic cement, fibrous material and a mixture of finely divided calcium carbonate and magnesium carbonate in which the calcium carbonate predominates obtained as a residue from the manufacture of carbonate of magnesium, in the presence of water, then working the mixture into sheet form on a mill-board machine before the cement sets, and then subjecting the sheets to pressure and allowing the cement to set.

9. A process of making sheet or plate material which consists in first intimately mixing hydraulic cement, fibrous material and finely divided precipitated magnesium carbonate in the presence of a large quantity of water, working the mixture into sheet form before the cement sets and subjecting the sheets to pressure and allowing the cement to set.

RICHARD V. MATTISON.